Jan. 7, 1969 S. H. KAPLAN 3,420,150

LIGHTHOUSE INTENSITY EXPOSURE CONTROL LENS

Filed May 10, 1965

INVENTOR.
Sam H. Kaplan
BY
Francis W. Crotty
Atty.

3,420,150

LIGHTHOUSE INTENSITY EXPOSURE CONTROL LENS

Sam H. Kaplan, Chicago, Ill., assignor to The Rauland Corporation Chicago, Ill., a corporation of Illinois Filed May 10, 1965, Ser. No. 454,275
U.S. Cl. 95—1 5 Claims
Int. Cl. G03b The present invention is directed to an improvement in the exposure chamber or lighthouse employed in the manufacture of color cathode-ray tubes and relates most particularly to an exposure intensity control lens.

Figure 1:
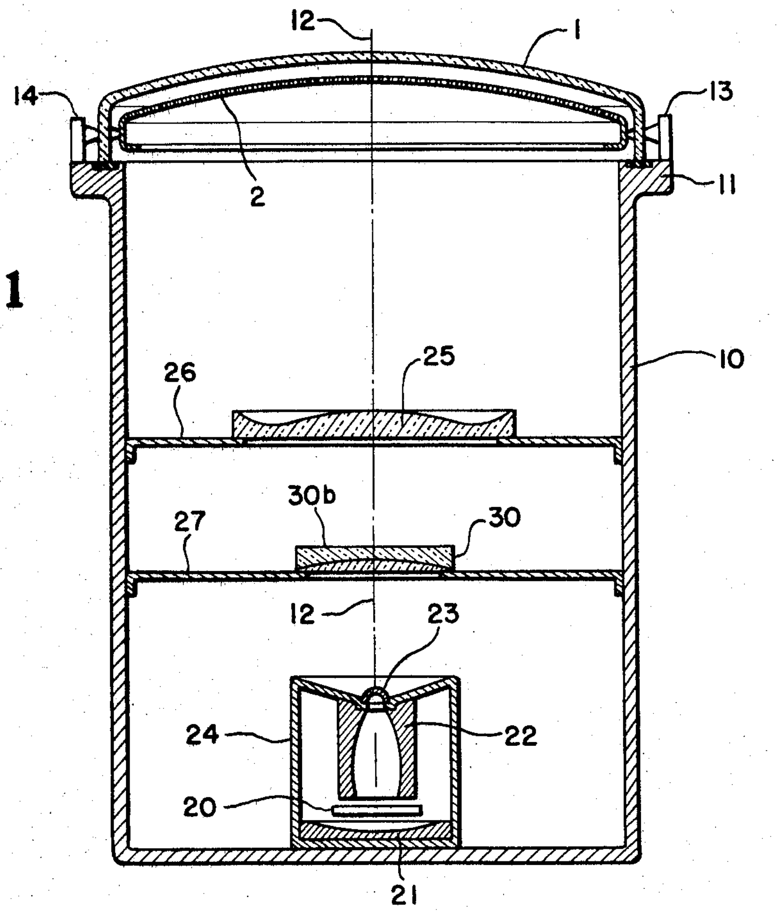

In the manufacture of color cathode-ray tubes, whether the elemental areas of the screen take the form of dot triads or stripes, it is convenient to use a photosensitive resist in establishing the pattern of color phosphor elements. Usually in processing a three-color tube, the elements of one color are all determined in one operation which is repeated for each of the three colors. For example, in the slurry process of forming the screen section of a dot type color tube, a slurry composition including a green phosphor and a photosensitive resist is applied as a thin layer over the entire inner surface of the cap or screen section of the tube. A shadow mask is then positioned within the cap and this subassembly is mounted in a lighthouse transversely of the optical or reference axis thereof. A light source, located in the lighthouse in a position that corresponds with the location of the center of deflection for the green electron gun of the tube to which the screen section under process is to be assigned, exposes the screen through the shadow mask and thereafter the resist is developed, leaving a pattern of green phosphor dots. This process, per se, is well known in the art and need not be discussed further for an understanding of the present invention.

In the practical application of this screening technique, the light source is a linear mercury vapor lamp with a collimator having a diffusing tip to simulate a point light source. The resulting exposure, in terms of light integration per unit area, turns out to be quite the opposite of that required for uniform dot formation across the whole surface of the screen. This is chargeable to two principal causes, (a) the distribution pattern of the exposing light source, and (b) the aperture size variation of the usual shadow mask. It is found, for example, that the light has its greatest intensity essentially along the reference or optical axis of the lighthouse and falls to a minimum value with increasing angle from the optical axis. Since uniform dot size requires that the integration of light be uniform for each exposed elemental area, it is apparent that the light distribution is inappropriate even were the mask to have a uniform aperture size throughout. Actually, the apertures decrease in diameter with distance from the center and this, in conjunction of the falling off of light intensity with distance and angle from the optical axis, compounds the difficulty and further leads to nonuniformity of exposure.

In the prior art, efforts have been made to control the intensity of the exposing light in order to achieve the desired size color phosphor dots at all parts of the screen. This has usually been accomplished by means of a variable thickness metal film deposited on that side of the correcting lens of the optical system which faces the light source. The metal film is deposited by evaporation and has a density gradient which is heaviest in the center and decreases towards the edges of the lens. The film may be likened to an absorption filter which has its maximum effect along the optical axis of the lighthouse and has a gradient which controls the distribution pattern of light intensity as desired.

Generally, chromium or rhodium are used in forming the filter but difficulty has been experienced in establishing the necessary density gradient and in maintaining control of exposure light intensity for any extended period of time in view of the high temperatures encountered in the lighthouse. It is found that chemical instabilities of the metal film cause the coating to become less dense or even disappear with continued use of the lens. When this occurs, it is necessary to replace, or at least recoat, the lens.

Accordingly, it is a principal object of the invention to provide an improved lens arrangement for controlling the intensity of exposure in the exposure chamber or lighthouse of a color picture tube manufacturing facility.

It is a specific object of the invention to provide an intensity exposure control lens which has improved stability and accurately determined absorption properties.

It is a further and specific object of the invention to improve the optical system of a lighthouse used in color tube manufacture, particularly, in the optical arrangement and the control of distribution of the exposing light.

The invention is a specific improvement in an exposure chamber having a reference axis, having means for supporting the screen section of a color cathode-ray tube and an assigned aperture mask transversely of that axis, and further having an optical system, including a light source with a nonuniform intensity distribution pattern in a plane transverse to the reference axis, for exposing the screen section of the tube through its mask. More particularly, the improvement comprises a lens element of a material which is absorptive at the wavelengths of light from the light source and which lens element has a thickness variation to compensate the nonuniformity of the light distribution pattern. The lens element is included in the optical system of the lighthouse or exposure chamber to effectively constitute one component of a plane-parallel lens which contributes negligible refraction and spherical aberration effects to said lighthouse.

The features of the present invention which are believed to be novel are set forth with particularity in the appended claims. The invention, together with further objects and advantages thereof, may best be understood by reference to the following description taken in connection with the accompanying drawing, in the several figures of which like reference numerals identify like elements, and in which:

FIGURE 1 is a schematic representation of an exposure chamber or lighthouse having the improvement of the subject invention for the purpose of controlling the intensity of exposure across the surface of a tube screen being processed;

In FIGURES 2–4*b* are modifications of the improved intensity controlling lens element included in the lighthouse of FIGURE 1.

Referring now more particularly to FIGURE 1, the arrangement there represented is referred to in the art as a "lighthouse" used in the screening of a cathode-ray tube for the reproduction of images in simulated natural color. As presently constructed, the envelopes of such tubes have two principal sections which are separate initially but are mated and bonded together to form a unitary envelope after the multi-color screen has been formed. These two principal components of the envelope are the faceplate or screen section which is rather like a shallow dish and the conical section which terminates at a narrow neck of one end while the other end is dimensioned and shaped accurately to correspond with the free end or flange of the screen section. The specific cross-sectional configuration of the screen may be round or rectangular; either may be processed in a lighthouse featuring the subject invention. In any event, a multi-color target is formed on the inner surface of the faceplate of the tube before the screen and cone sections are assembled.

Since the present invention is directed solely to screening, no further consideration will be given to the other processing steps employed in fabricating the complete color tube.

It will also be convenient in this detailed discussion of specific embodiments of the invention to assume that the tube is of the dot triad type having three groups of phosphor dots or elements which, in response to electron excitation, emit light of one of the three colors. Each color group is formed by the same process except that only one such group is developed in any operating cycle and also the exposing light source has one position to expose the green phosphor, and distinctly different positions for the remaining colors, namely, the blue and red. The function of the lighthouse aside from these specific differences is the same in the processing of each of three color groups and, therefore, it is sufficient to consider only one process without any particular regard for the color component that may be involved.

The lighthouse comprises an enclosure 10 shown schematically in that it usually has cooling and adjusting mechanisms which of themselves are of no moment to the present discussion and have been omitted to simplify the drawing. The lighthouse can be completely closed on all sides and faces except for the uppermost face 11 which is cut away to form a shelf for receiving and supporting the circumferential edge or the periphery of the screen section 1 of the tube under consideration. The shelf 11 must be deep enough to provide firm support for screen section 1 while permitting total exposure of the area of the screen to be covered with color phosphor dots and it must have panel locating or referencing means. The shelf 11 supports screen section 1 in an exposure position in which the screen is normal to the reference or optical axis 12—12 of the lighthouse.

Since the screen is to be exposed through its assigned aperture or shadow mask, the mask 2 is supported within the screen so that collectively they constitute a subassembly. Their association may be accomplished in a variety of ways. Frequently, studs are provided within the flange of screen section 1 to receive mounting springs secured to the external periphery of shadow mask 2. It will be assumed that the diameter of the mask apertures decreases with distance from the center of the mask in all radial directions.

Fixtures 13 and 14 are attached to shelf 11 to facilitate quickly and accurately securing or locating screen section 1 and its mask in an appropriate position for exposure, properly indexed about the optical axis of the lighthouse to simulate the final position of the screen section in the completed tube.

In order to expose screen section 1 through shadow mask 2, a light source 20 is supported within the lighthouse at a predetermined distance from the central portion of the screen section in the general direction of or along axis 12—12, in a position corresponding to the center of deflection of that beam which the light source simulates during the exposure process. Structurally, the light source is a linear high pressure mercury lamp behind which is positioned a spherical reflector 21 of aluminum. Its emission contains considerable ultraviolet light in the range from 3,000 to 4,000 Angstroms and its excitation circuit has been omitted since it is well known and is of no particular concern to the present discussion. Opposite reflector 21 is a collimator 22 constructed of metal, such as aluminum, which reflects ultraviolet light. It is a cylinder with an internal cavity representing the external configuration of the usual quartz collimator. Its configuration is rather like that of a bullet, being circular in any plane transverse of its longitudinal axis. Its diameter at the large end is dimensioned to encompass the maximum light output of source 20 but the opposite end is of relatively small diameter and terminates in a diffusion tip 23 which may be formed of quartz. The lamp 20, reflector 21 and collimator 22 may be contained within a housing 24 and suitably supported within lighthouse 10.

The optical system of the lighthouse, in addition to light source 20, includes what is known as a correcting lens or plate 25 which corrects for well-known misregistration errors. The specification for such a lens and its orientation relative to and along the optical axis of the lighthouse are described in applicant's Patent 3,003,874, issued on Oct. 10, 1961. This lens is supported transversely of optical axis 12—12 by means of a shelf 26 which is cut away in its central portion so as not to adversely interfere with the optical system.

On a second shelf 27 of similar construction, there is supported another lens element 30 to be considered more particularly hereinafter. Suffice it to say at this juncture that it constitutes a plane parallel lens arranged to introduce negligible spherical aberration effects to the optical system.

If the details of lens 30 are ignored momentarily, the arrangement will be seen to be a conventional lighthouse structure with which the slurry-coated screen section 1, with its shadow mask 2, is associated for exposure. With the subassembly of screen and mask in position, light source 20 is energized and the screen is exposed through the mask so that further development results in the formation of one group of phosphor dots disposed on the inner surface of screen 1. No novelty is claimed for this structure as such; rather, the contribution is in the control of the intensity of the exposure light.

As explained in the introductory portions of the specification, the described light source has a nonuniform intensity distribution pattern in that the light exhibits maximum intensity generally along the direction of the optical axis and the intensity falls to a minimum in all radial directions at increasing angles relative to the axis. The lens 30 compensates this nonuniformity and further adjusts the intensity of exposing light to accommodate the change in aperture diameter since, as assumed, the hole size decreases in all radial directions with distance from the center.

Structurally, lens 30 is comprised of a first lens element **30*a* formed of a material which is absorptive at the wavelength of light emitted from source 20. This lens has the configuration of a spherical section and is a planoconvex lens. It is associated with a companion lens element 30*b* formed of a material that is highly transmissive at the wavelength of light from source 20. Element 30*b* is a plano-concave lens in juxtaposition in the optical system of the lighthouse to element 30*a* and is dimensioned and contoured in relation to the plano-convex lens to constitute therewith a plane-parallel lens which contributes no material refraction or spherical aberration over that which the optical system otherwise normally exhibits. Practical embodiments of the plane-parallel lens 30 have been constructed in which the absorbing lens 30*a* is formed of a glass such as Corning glass #7–37 while its mating lens element 30*b* is ground from clear glass. Should the plane-parallel lens 30 contribute any spherical aberration, the profile or formula of correcting plate 25 may be modified to correct for it. Lens 30 is positioned so that its center falls on a line drawn from tip 23 to the center of the panel 1** under process.

The lens element **30*a* is thickest at the optical axis 12—12 and its thickness is reduced in all radial dimensions with increasing angle relative to the axis. This variation in thickness compensates both for the nonuniform intensity distribution of light source 20 and the nonuniform diameter of the holes in mask 2 to the end that all elemental areas of screen section 1** receive essentially the same exposure.

Figure 2:

Of course, if one were to refigure correcting plate 25 in order to correct any contribution of spherical aberration by lens 30, it would be appropriate, in regrinding the correcting plate, to use the structure of FIGURE 2 in which lens element **30*a'* is constructed as a section of correcting lens 25'. Where this structure is adopted, the contiguous portions of the correcting lens perform the function of the plano-concave lens of 30***b* of the arrangement of FIGURE 1 so that in effect there is a plane-parallel lens including section 30*a'* which controls the exposure intensity but essentially preserves the properties of the optical system without impairment.

Usually, it will be convenient to form lens element 30*a* as a section of a sphere but that, of course, is not a necessary limitation. It may, for example, have a parabolic or other shape rotated about an axis of symmetry and its mating lens 30*b* is constructed to have the same shape but being concave rather than convex.

Figure 3:

While the exposure control will generally be obtained by the use of a lens that is a surface of revolution, the concept of the invention may be equally applied to the case where the intensity in the lighthouse is found to be stronger on one side of a diameter than on the other. In that event, correction may be obtained by introducing a prism 30*a''* of absorptive material to attain the desired light distribution. A structure of this type is represented in FIGURE 3. Correction for intensity variations on opposite sides of a diameter may also be realized by offsetting the absorbing filter in the direction of the area that otherwise receives the stronger exposure.

Figure 4A:
Figure 4B:
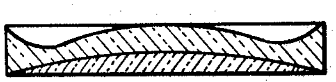

Lens elements which have different curvatures in different directions, referred to as a toric-type lens which in the extreme become a section of a cylinder, may also be employed to control exposure in accordance with the invention. FIGURE 4*a* is a front view and FIGURE 4*b* is a side view of a plane-parallel lens of this type.

In the lighthouse, improved with the addition of lens element 30*a*, the intensity of exposure is accurately and conveniently controlled in a completely stable manner. Difficulties of prior devices attributable to chemical instabilities are overcome and precise control of exposure may readily be attained.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. In an exposure chamber having a reference axis, means for supporting the screen section of a color cathode-ray tube and an assigned aperture mask transversely of said axis, and an optical system, including a light source having a nonuniform intensity distribution pattern in a plane transverse to said axis, for exposing said screen section through said mask, the improvement which comprises a lens element of a material which is absorptive at the wavelength of light from said source, said lens element having a thickness variation to compensate for the nonuniformity of said distribution pattern and being included in said optical system to effectively constitute one component of a plane-parallel optical member which contributes negligible refraction and spherical aberration effects to said optical system.

2. In an exposure chamber having a reference axis, means for supporting the screen section of a color cathode-ray tube and an assigned aperture mask transversely of said axis, and an optical system, including a light source having a nonuniform intensity distribution pattern in a plane transverse to said axis, for exposing said screen section through said mask, the improvement which comprises a plano-convex lens of a material which is absorptive at the wavelength of light from said source and has a thickness variation to compensate the nonuniformity of said distribution pattern;

and a plano-concave lens of a material which is transmissive at the wavelenth of light from said source, in juxtaposition to said plano-convex lens in said optical system, and having dimensions and a contour related to those of said plano-convex lens to constitute therewith a plane-parallel optical member which contributes negligible refraction and spherical aberration effects to said optical system.

3. In an exposure chamber having a reference axis, means for supporting the screen section of a color cathode-ray tube and an assigned aperture mask transversely of said axis, and an optical system, including a light source having a nonuniform intensity distribution pattern in a plane transverse to said axis and further including a correcting lens for exposing said screen section through said mask, the improvement which comprises a plano-convex lens constructed as a section of said correcting lens but formed of a material which is absorptive at the wavelength of light from said source and having a thickness variation to compensate the nonuniformity of said distribution pattern, said lens element and the contiguous portions of said correcting lens effectively constituting a plane-parallel lens which contributes negligible refraction and spherical aberration effects to said optical system.

4. In an exposure chamber having a reference axis, means for supporting the screen section of a color cathode-ray tube and an assigned aperture mask transversely of said axis, and an optical system, including a light source having a nonuniform intensity distribution pattern, for exposing said screen section through said mask, the improvement which comprises a lens element formed as a spherical section of a material which is absorptive at the wavelength of light from said source, said lens element having a thickness variation to compensate the nonuniformity of said distribution pattern and being included in said optical system to effectively constitute one component of a plane-parallel lens which contributes negligible refraction and spherical aberration effects to said optical system.

5. In an exposure chamber having a reference axis, means for supporting the screen section of a color cathode-ray tube and an assigned aperture mask transversely of said axis, and an optical system, including a light source having nonuniform intensity distribution pattern which decreases from a maximum along said axis to a minimum in a plane transverse to said axis for exposing said screen section through said mask, the improvement which comprises a lens element formed as a spherical section of a material which is absorptive at the wavelength of light from said source, said lens element having a thickness variation corresponding substantially to the intensity variation of said light source to compensate the nonuniformity of said distribution pattern and being included in said optical system to effectively constitute one component of a plane-parallel lens which contributes negligible refraction and spherical aberration effects to said optical system.

References Cited

UNITED STATES PATENTS 3,279,340 10/1966 Ramberg -------------- 95—1

JOHN M. HORAN, *Primary Examiner.*